US008272531B2

(12) United States Patent
Cuillery et al.

(10) Patent No.: US 8,272,531 B2
(45) Date of Patent: Sep. 25, 2012

(54) HANDLE FOR A STACKABLE CULINARY ARTICLE AND A SET OF SUCH HANDLES AND ARTICLES

(75) Inventors: Pascal Cuillery, Faverges (FR); Stéphane Plichon, Annecy (FR); Guy Magnouloux, Annecy (FR); Jean-Francois Brasset, Annecy (FR)

(73) Assignee: SEB SA, Ecully (FR)

(*) Notice: Subject to any disclaimer, the term of this patent is extended or adjusted under 35 U.S.C. 154(b) by 197 days.

(21) Appl. No.: 12/097,661

(22) PCT Filed: Dec. 8, 2006

(86) PCT No.: PCT/FR2006/002689
§ 371 (c)(1),
(2), (4) Date: Jun. 16, 2008

(87) PCT Pub. No.: WO2007/080252
PCT Pub. Date: Jul. 19, 2007

(65) Prior Publication Data
US 2009/0049650 A1 Feb. 26, 2009

(30) Foreign Application Priority Data
Dec. 16, 2005 (FR) ...................... 05 12861

(51) Int. Cl.
*B65D 25/10* (2006.01)
(52) U.S. Cl. .................... 220/573.1; 220/756; 220/771; 220/23.6; 206/514
(58) Field of Classification Search ............. 220/756, 220/770, 573.4, 696, 710.5, 741, 752, 771, 220/23.6, 4.26, 573.1; 206/510, 501, 514; 16/422, 425, 430; 99/340
See application file for complete search history.

(56) References Cited

U.S. PATENT DOCUMENTS

| 1,268,017 A | * | 5/1918 | Knight | ....................... 220/573.4 |
| 2,073,475 A | * | 3/1937 | Gordon | ........................... 294/33 |
| 3,765,563 A | * | 10/1973 | Kraft et al. | .................... 220/316 |
| 4,083,081 A | * | 4/1978 | Witte | ............................. 220/759 |
| 4,423,825 A | * | 1/1984 | Baugarten | .................... 220/316 |

(Continued)

FOREIGN PATENT DOCUMENTS
FR          1301322     *   7/1961

*Primary Examiner* — Mickey Yu
*Assistant Examiner* — Kareen Rush
(74) *Attorney, Agent, or Firm* — Stephen Bongini; Fleit Gibbons Gutman Bongini & Bianco PL

(57) ABSTRACT

A set of handles is provided for gripping a first cooking culinary article that includes a first container, and a second cooking culinary article that includes a second container. These containers can be stacked in a stationary stacked position. Each handle includes a stud and/or a housing defined at least partly by a hollow zone of the handle, and a locking protrusion adapted to engage a reception zone and/or a reception zone adapted to engage a locking protrusion. The housing and/or stud of the first handle can engage with the housing and/or stud of the second handle for holding the containers superimposed in the stationary stacked position in which the first container does not contact the second container. The locking protrusion and/or reception zone of the first handle can engage with the locking protrusion and/or reception zone of the second handle, with the locking protrusion located along a vertical wall of the stud, and the reception zone located along a vertical wall of the housing.

21 Claims, 5 Drawing Sheets

U.S. PATENT DOCUMENTS

| | | | | |
|---|---|---|---|---|
| 4,680,829 A | * | 7/1987 | Baumgarten | 220/759 |
| 4,724,576 A | * | 2/1988 | Tatematsu | 220/763 |
| 5,422,076 A | * | 6/1995 | Jones | 600/574 |
| 5,924,592 A | * | 7/1999 | Hieronymus | 220/574.1 |
| 5,957,038 A | * | 9/1999 | Shimazaki | 99/340 |
| 2010/0230319 A1 | * | 9/2010 | Thomson | 206/514 |

* cited by examiner

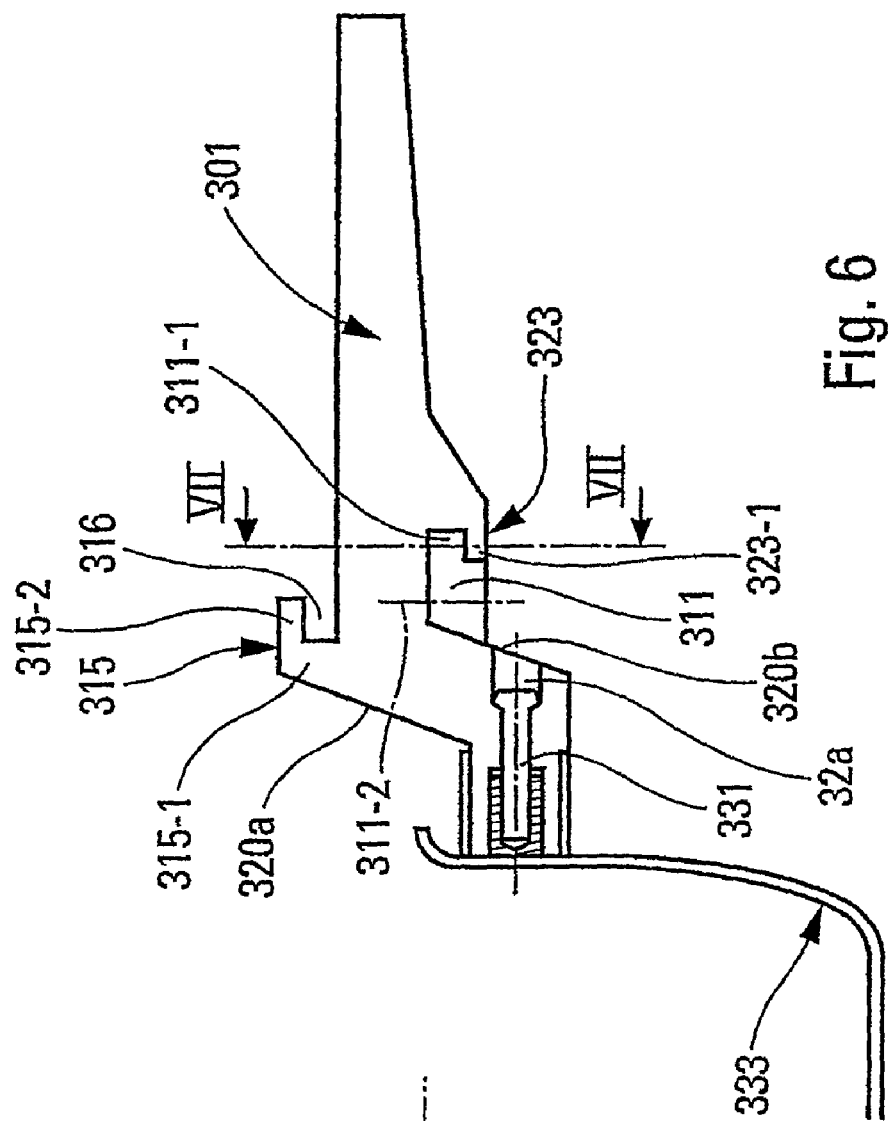
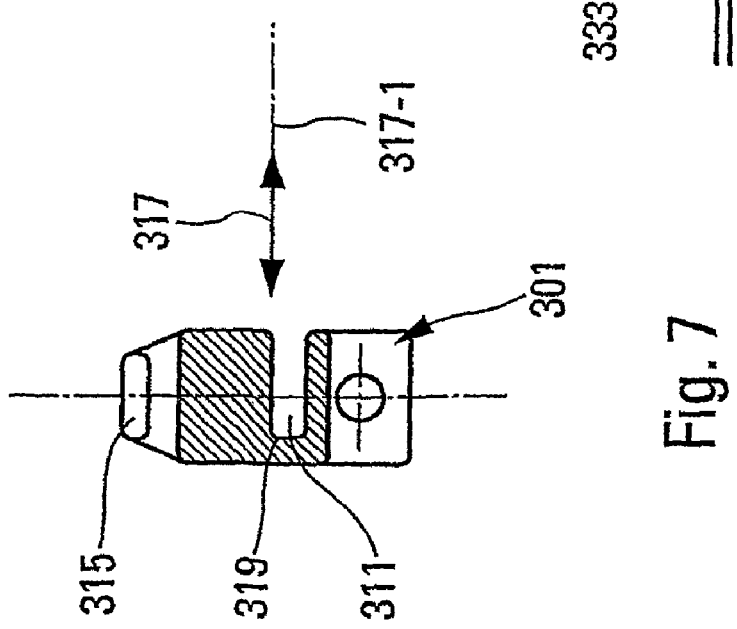
Fig. 6
Fig. 7

HANDLE FOR A STACKABLE CULINARY ARTICLE AND A SET OF SUCH HANDLES AND ARTICLES

FIELD OF THE INVENTION

It is a question here of improving the conditions for stacking cooking culinary articles, for a cooker and hotplate, and the production of handles adapted to this situation is also concerned, a culinary article following a stacking movement.

There is also concerned here a set comprising several (at least two) such culinary articles, identical or different, preferably from among saucepans, frying pans and cooking pots, stacked and at least in certain cases in conformity with the characteristics of the culinary article in question.

BACKGROUND OF THE INVENTION

Culinary articles are known that can be stacked with another culinary article, each article comprising a container, for receiving in particular food therein, and at least one handle for gripping with the bare hand, this handle having at least one stud and/or or at least one housing defined, at least partly, by a hollow area of said handle, for holding in a stack the top article superimposed on another stack, the housing and/or the stud being for this purpose adapted respectively to receive another stud and/or to be received in another housing complementary to the aforementioned and provided on the handle of this other article.

SUMMARY OF THE INVENTION

In a preferred specific application, the invention therefore concerns a set of frying pans or saucepans/cooking pots which, roughly, stack substantially vertically, with a substantially horizontal individual position, nesting the handles.

In the context of the stacking problem posed here, it is preferentially wished for the stacking of two articles with non-consecutive diameters to remain possible, this configuration corresponding to the case where an article in the middle of the stack is stacked on an article at the bottom of the stack, for example.

It is also wished, if possible, to be able not only to stabilise horizontally, or in a situation close to the horizontal, the erected stack of articles, or stackable handles, but also to stabilise the articles in a stack about a vertical or substantially vertical axis, so as to prevent the top article turning vis-à-vis the bottom article.

It is also sought preferably to stabilise the lateral inclination, or the angular orientation about the vertical stacking axis, of the articles, with respect to one another.

In general terms there is therefore sought here a solution favouring a stable balanced erected stacking with easy to use means, with controlled cost, easy to manufacture, simple to integrate on a handle and/or an existing culinary article and mechanically efficient with regard to the effect produced, if possible, in the orientation of the handles and/or articles in the stack in different planes (horizontal, vertical, etc.), with also a releasable locking effect that is as practical, effective, inexpensive and ergonomical as possible.

It should also now be noted that "cooking" culinary article means an article designed in particular to put on a flame or on a surface heating from below, outside an oven, in particular on a cooker or hotplate.

To satisfy all or some of these objectives, it is advised that the handle and/or the culinary article for which it is intended, each being of the type roughly defined above, be such that it also comprises a locking protrusion and a reception zone adapted respectively:

to be engaged with another reception zone provided on the handle intended for said other article, and to receive the engagement of another locking protrusion provided on this handle intended for the other article.

This "inter-engagement" can consist of respective supports, in particular during the stacking movement of the handles, which will comprise a tilting, in one direction, of one handle with respect to the other.

There may then be a relative locking between the handles, by abutment between the locking protrusion and the reception zone of these handles, then stacked one on the other.

Thus it will be possible to lock two handles and typically two stacked articles simply and effectively on each other.

In particular, in a first embodiment, provision is preferably made for:

one from among the protrusion and the reception zones to be formed at the same location as the stud, and/or the other one from among said protrusion and reception zone to be formed at the same place as or in the immediate vicinity of the housing.

A limited clearance will favourably exist between the stud of one said handle and the housing of the other handle, when the first engages in the second, after which it will be able to lock therein, during said tilting, if there is relative jamming between the protrusion and said reception zone with which it is engaged.

It is also advised that, prior to tilting, the stacking movement should comprise a translation, which leads to the coming together of the protrusion and the corresponding reception zone.

Typically, in order to arrive at this effect, the translation will take place substantially vertically and the (slight) tilting of the handle will be effected downwards and forwards, so as typically to make the container of the top culinary article, then disposed inside the other, under it and with a larger cross-section, tilt downwards. It is also possible to provide a relative pivoting in a substantially horizontal plane (FIG. 6 and seq below).

In the first case, if the stud of one article is engaged in the housing of the other, it will suffice to "let go" of the handle, the greater weight of the container and gravity naturally making this article tilt towards the aforementioned (reversible) jamming position.

In relation to the above, provision is also made, favourably:

for the handle to be (adapted to be) connected to the container, at a first end, and for the stud and housing of the same handle to be situated closer to this first end than the second opposite end of the handle, and/or for the protrusion to comprises a bottom slanting wall area, externally convex towards the bottom, and then, for the reception zone, here the corresponding support wall to have a slanting wall area, convex upwards and adapted to receive closely said lower wall area of the handle of the top one.

It is also advised for:

the engagement movement to take place in a vertical or substantially vertical plane, the stud and the housing to be erect vis-à-vis the corresponding handle, the protrusion to be formed locally along an erect wall of said stud, the corresponding reception zone to be formed at the same point as an orifice transverse to the direction in which the stud and housing rise and with which this housing communicates.

As shown below in FIG. 3, the aforementioned transverse orifice can receive a screw for fixing the handle to the container.

Overall, the above characteristics will facilitate the production of the handle and will make it possible to take advantage of the existence of the transverse orifice, also useful.

In the same spirit, it is advised for:
during the stacking movement, the stud to reach essentially as far as opposite the corresponding transverse orifice and to remain there, at the end of the tilting,
and/or for the reception zone to be formed at the rim of the housing where the latter communicates with said transverse orifice.

To promote a natural tendency for the protrusion to jam against its reception zone (here a support wall) in the stacked position of the articles, it is also advised for the handle to be connectable/connected to the container at a first end, and for the stud and housing of one and the same handle to be situated closer to this first end than the opposite second end of the handle (the case in FIGS. 1 to 5 below).

In relation to the above, provision will then be made preferably (FIGS. 1 to 3) for:
the protrusion to comprise a bottom slanting wall area, externally convex downwards, and
the corresponding support wall to have a slanting wall area, concave upwards and adapted to closely receive said bottom wall area of the article concerned.

In a variant embodiment, provision has also been made for the reception zone to be situated behind an opening formed in the corresponding handle, this opening being adapted to allow the protrusion to pass through it, this passage of the protrusion occurring during the stacking movement.

The reception zone and the protrusion can be situated at a distance from the stud and housing.

The stacking movement will favourably comprise the passage of the protrusion through the corresponding opening which, with the tilting, will bring the engagement of the stud in its housing, and the engagement of the protrusion with its reception zone.

Provision has also preferably been made:
for the stud and housing to be situated closer to the container than the protrusion and said opening,
and for the protrusion to be in the form of a hook projecting on the surface of the handle.

Favourably:
the opening will be formed, or will emerge, in a top or bottom wall of this handle,
and the protrusion will be in the form of a hook projecting above or below said handle.

As an alternative, the opening could be formed in a lateral (left or right) wall of the handle, the protrusion then preferably still being in the form of a projecting hook, but which would project laterally from the handle.

It is also possible to provide for a situation with two cooperating hooks, one projecting on the top and the other on the bottom, on the/each handle.

BRIEF DESCRIPTION OF THE DRAWINGS

Hereinafter an even more detailed description is provided, in relation to the accompanying drawings given solely by way non-limitative examples and in which:

FIG. 6 shows another variant embodiment, FIG. 7 is a section along VII-VII in FIG. 6.

DETAILED DESCRIPTION

Hereinafter the handles are shown fixed to the culinary articles. They could be separate.

Figure 1:
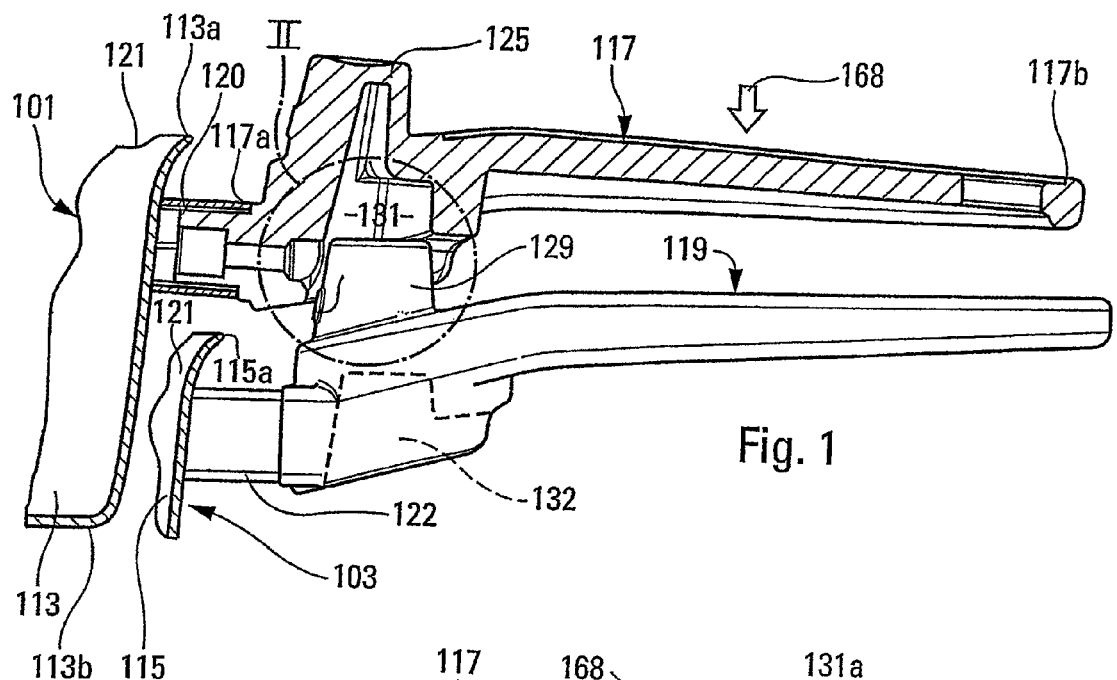
FIG. 1 shows a view in diametral section of two parts of saucepans in accordance with the solutions presented here, along a vertical plane passing through the extension axis of the handles, or hafts, of each of these stacked saucepans, according to a first embodiment.

In FIG. 1 two culinary articles 101, 103 are therefore seen, stacked one on the other, in an upright stack.

It is a question in this case of two saucepans of non-consecutive sizes belonging to the same batch of saucepans able to at least partially fit together through their container.

Each culinary article 101, 103 comprises a container respectively 113, 115 and a gripping handle 117, 119.

Each handle is here in the form of an elongate handle fixed at one end, by a flame-resistant base 120, 122, to the lateral wall of the container, at the top part, close to the top peripheral rim 113a, 115a which delimits each container around its top opening 121, 123.

Each handle 117, 119, thermally insulated, enables the culinary article concerned to be held in the bare hand and with the whole hand.

In addition, each handle 117, 119 comprises, in accordance with the invention, a stud 125, 129 and a cooperating housing 131, 132.

In the embodiment in FIG. 1, the projecting studs 125, 129 and the corresponding housings 131, 132 are entirely formed at the same place as the corresponding handle.

In order to stack, in a stable fashion, the top article 101 on the bottom article 103, the container diameter of which is greater, the stud 129 is disposed inside the housing 131.

The stack is stable because of this engagement, without there being contacts between the articles 101 and 103 other than that between the lateral surface 129a of the stud 129 and the one 131a that surrounds, here closely, the housing (see FIG. 2, as well as contact zones between protrusions and support walls, hereinafter). In particular, the containers are not in contact with each other.

In FIG. 1, assuming that the bottom 113b of the container is disposed approximately horizontally, the studs and housings in the stack formed are all erected along a vertical axis or one close to the vertical.

The horizontal separation between the elevation axes of the stud 125 and the corresponding housing 131 is small.

Each stud 125, 129 is erected on the top part of the handle, the housings being formed opposite, at the bottom part.

The two articles therefore lodge in each other overhanging, here therefore solely by means of the engagement of the stud 129 in the housing 131. This engagement is here conical, the studs and housing each being frustoconical.

It would have been possible to reverse the stud and housing, so that the stud would stand up under the bottom wall of the top handle, while the housing would be hollowed in the top face of the bottom handle, in order to indicate that what follows can just as well apply by reversing stud and housing, and likewise for the protrusion and support handle.

In FIGS. 1 to 4 and for preference, on the stud 129 there appears a locking protrusion 162 and, near the cooperating housing 131, there appears a reception zone 164, here a support wall.

The protrusion 162 is adapted to be received against the reception zone/support wall 164 provided on the article 101.

The handles being identical to each other, the housing 132 of the underlying article 103 is for its part adapted to receive against it another article identical to the previous one, but in principle with a different container size.

These situations of relative engagement arise during a stacking movement which will consist here in particular of allowing the top article 101 to tilt in the direction of the arrow 168, with respect to the underlying article 103, until there is relative locking between these articles, by abutment between the locking protrusion and the support wall concerned.

The support wall could have been in the same place as the stud, hollowed out, the protrusion then being formed at the same point as the housing.

Here it is the opposite. The support wall 164 is formed slightly recessed from the housing 131.

The culinary articles are stacked in a vertical or substantially vertical direction (it is therefore possible to imaging a slanting approach inclined with respect to the vertical).

Transversely to this engagement direction, and in particular here substantially horizontally, a limited clearance exists between the stud of an article and the housing of the other article, when the first engages in the second, here by translation in the direction of the arrow 168.

Figure 4:
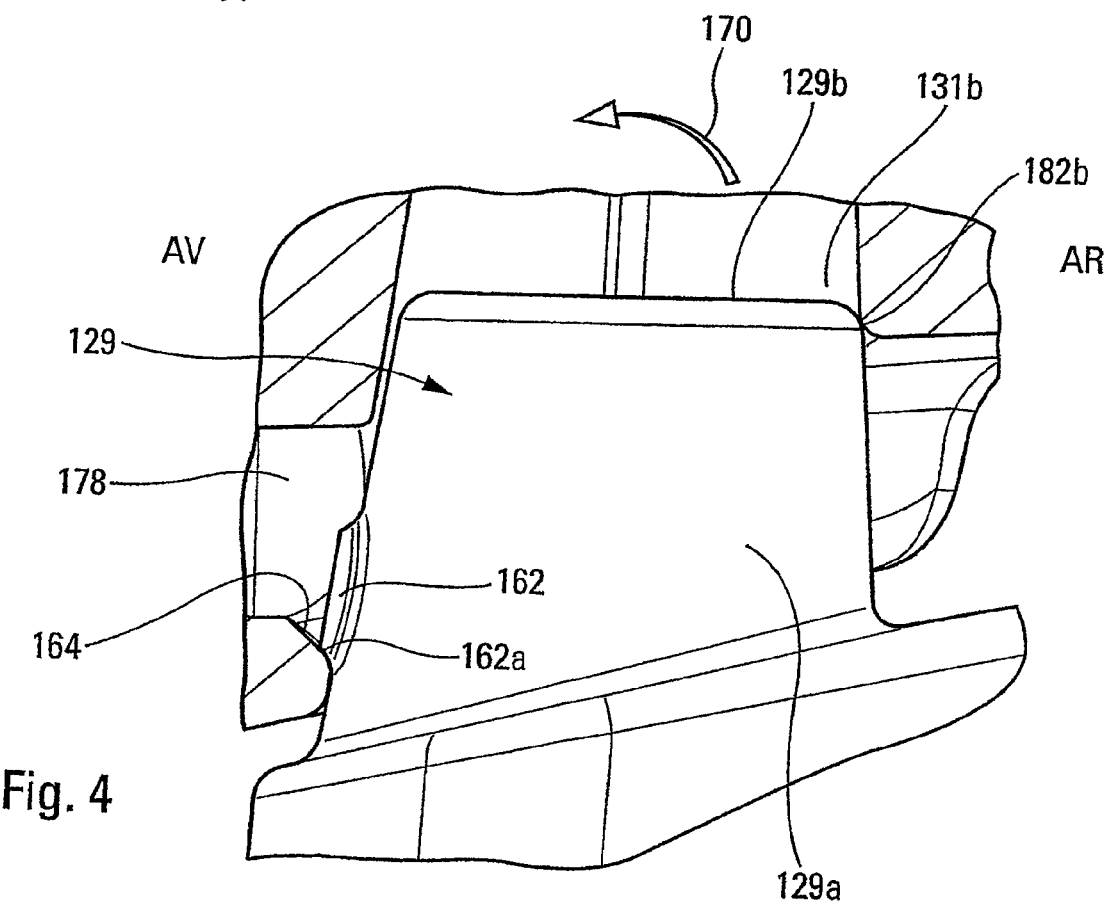

After this, the stud 129 is locked in the housing 131, when the tilting takes place, arrow 170 FIG. 4.

A relative jamming is therefore arrived at between the protrusion 162 and the support wall against which it has engaged.

The translation, here therefore effected prior to tilting, leads to this protrusion and its corresponding support wall 164 being brought closer together.

The protrusion, such as 162, is formed in a location along an erect lateral wall 129a of the stud, here at the front of the stud, on the side close to the container, close to the broadened bottom base of the stud.

Figure 3:
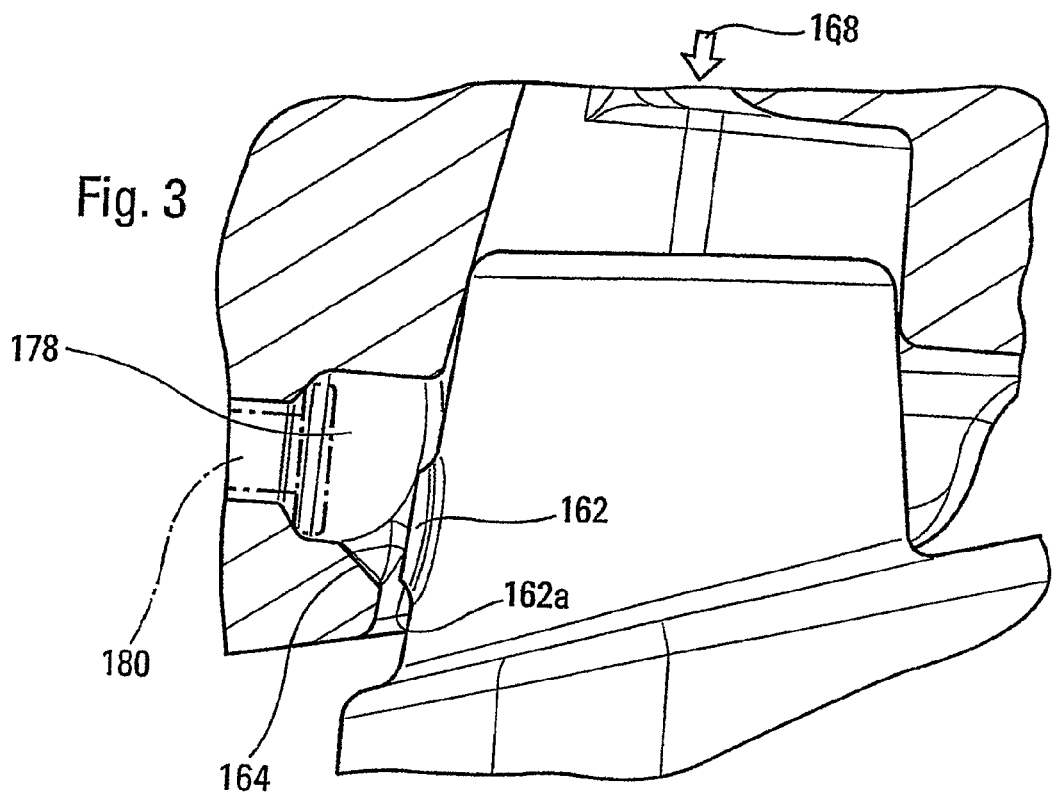

The corresponding support, such as 164, is formed at the point of an orifice 178 transverse to the direction along which the housing 131 stands, FIGS. 3 and 4.

This orifice 178 and the housing communicate, in particular to make it possible to engage a means of fixing the handle on the container, such as a screw shown schematically at 180 in FIG. 3.

As an alternative, the protrusion could have been situated to the rear, towards the top of the stud, the cooperating housing then being disposed accordingly, at the rear, at the top of the housing.

A lateral arrangement, with for example two studs and two housings, one per side, could also have been achieved.

Figure 2:
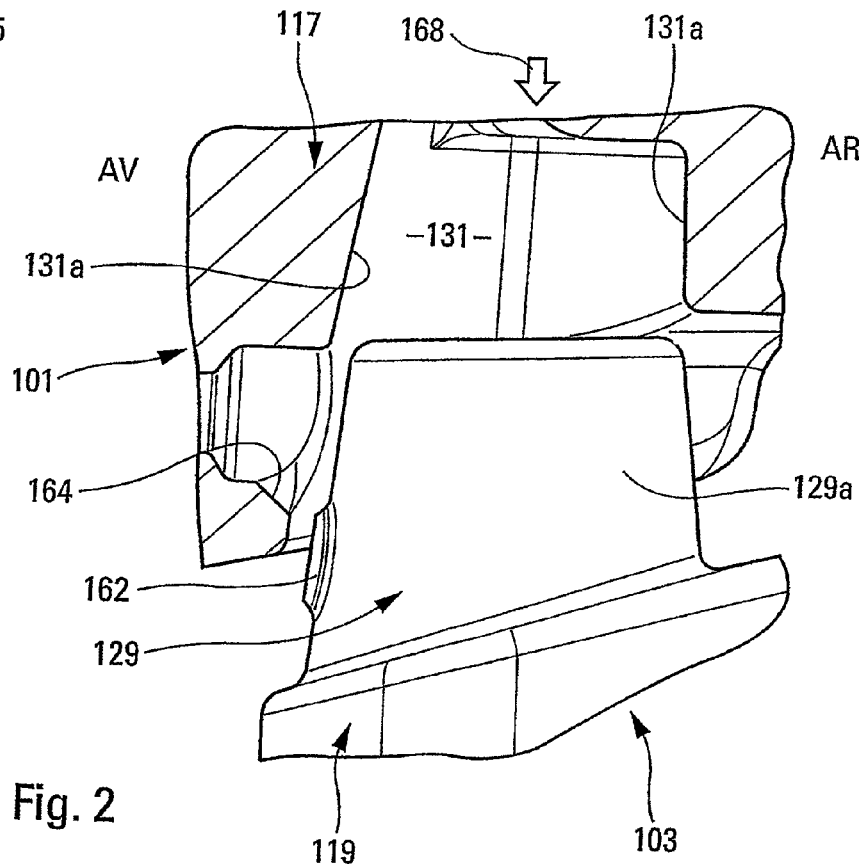
FIG. 2 presents an enlarged detail view (II) illustrating the first part of the stacking movement of the embodiment in FIG. 1, corresponding to the approach translation, FIGS. 3 and 4 showing the continuation and end of the locking.

In FIGS. 2 to 4, the support wall 164 is formed at the rim of the housing concerned, here at the limit of the intersection with the transverse orifice 178.

Thus, during translation, the protrusion 162 will be brought, at least essentially, to face this transverse orifice (see FIGS. 3 and 4), here above the wall 164, and will remain there, during the locking tilting, then engaging the support wall situated on its path.

It will be noted in FIG. 1 that the stud such as 125 and the housing such as 131 of one and the same handle, such as 101, are situated closer to the first end 117a where the handle is connected to the container, than the second opposite end 117b of this handle.

This, combined with the additional weight on the container side and the arrangement of the cooperating protrusion and housing promotes the "natural" tilting sought, giving rise to the locking to be obtained.

It will also be noted that each protrusion, such as 162, is here in the form of a rounded knob, a truncated cone with an oval base, elongate in the direction of the height.

This protrusion comprises a bottom zone of a slanting wall 162a, externally convex towards the bottom.

In a complementary fashion, the corresponding support wall, such as 164, is defined by a slanting wall area, concave towards the top.

In FIG. 4, at least two contact zones 162a-164 and 182b are defined, because of the engagement of the stud in the housing and that of the protrusion 162 against the support wall 164.

The first contact zone 162a-164 is therefore situated towards the base of the protrusion, close to the opening in the housing 131 through which the stud was engaged where, on the closest side of the container, the handles are fixed.

The other contact zone 182b (here at the top and rear) is therefore situated opposite, towards the bottom 131b of the housing 131, and therefore towards the top 129b of the stud 129.

Considering therefore the front (AV) of the side of the container and the rear (AR) opposite, the said first peripheral contact zone is situated at the front at the bottom of the housing and stud, while the other opposite contact zone 182b is situated at the rear, at the top.

Figure 5:
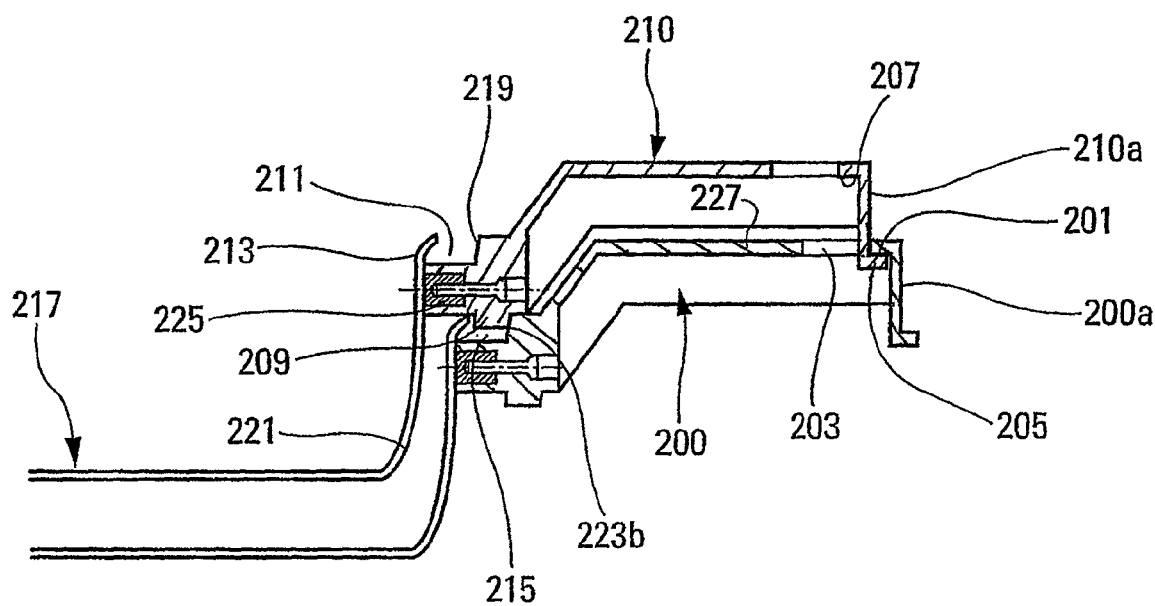
FIG. 5 shows a variant embodiment, in the stacked state of two saucepans, in a view comparable to that in FIG. 1.

In the variant in FIG. 5, the support wall 201 is situated behind an opening 203 formed in the corresponding handle 200.

This opening is adapted to allow the protrusion 205 to pass through it, this passage occurring during the stacking movement.

The support wall 207 and the protrusion 205 are situated at a distance from the stud 209 and housing 211, closer to the free end 210a of the handle 210.

In this figure, the stud 209 directed downwards substantially vertically at the bottom part of the handle 210, close to its front end making contact with the base 213, engages in a housing 215 formed at the top part of the handle 200 of the bottom article.

More precisely, each housing is here defined partly by a wall of the handle and partly by an area of the container of the same article.

Thus, for the top article 217 for example, the housing 211 is delimited, at the dorsal part, by a frontal wall 219 standing at the front part of the handle 210, while at the frontal (front) part, this housing is delimited by the top part of the lateral wall of the container 221 still terminating in an external rim.

At the retaining stud 209, it is also remarked that the rear holding is achieved in the environment of the rear contact zone 223b between part of the rear lateral surface of the stud close to its top, which therefore comes into contact with a low rear part situated close to the bottom, at the rear, of the housing 215, whereas the front abutment in the zone 225 close to the base of the stud and situated at the front of it takes place by contact with end of the rim of the container.

It will be understood that, in the absence of a rim or in a variant embodiment, the front support 225 could take place lower in contact with the wall of the container concerned.

Yet again, it will be remarked that, when the stud engages in the housing 215, there has been a slight tilting forwards (on the container side) of the top article.

This tilting has here been preceded by the passage of the protrusion 205 through the opening 203.

The tilting has caused the engagement of the stud 209 in its housing, with abutment between the protrusion 205 and the corresponding support wall 201.

The stud and housing are situated closer to the container than are the protrusion and opening of each handle, such as 210.

The protrusion is here in the form of a hook projecting on the surface of the handle in question.

Each opening, such as 203, is formed in the top wall 227 of the handle in question.

The protrusion, such as 205, is then projecting below the handle.

The hook 205 is formed at the end 210a of the handle, at the bottom, like an external rim, substantially horizontal.

Each opening, such as 203, is slightly recessed from this end (here 200a), so that the wall 201 is situated between it and this end 200a.

It would have been possible to form the protrusion with a projection towards the top and then produce each opening in the bottom wall of the handles.

And in place of a saucepan, it would of course have been possible to connect the handles considered here to other types of article, in particular frying pans and/or cooking pots.

It will also be noted that it would have been possible to obtain an acceptable quality of stacking without a stud, or even without the conformation defining each housing.

This can define a particular protection field, with therefore a handle or a set of handles (each) having as a nesting means and relative holding between handles, only the protrusion and opening (with support wall) presented in relation to this FIG. 5.

Figure 8:
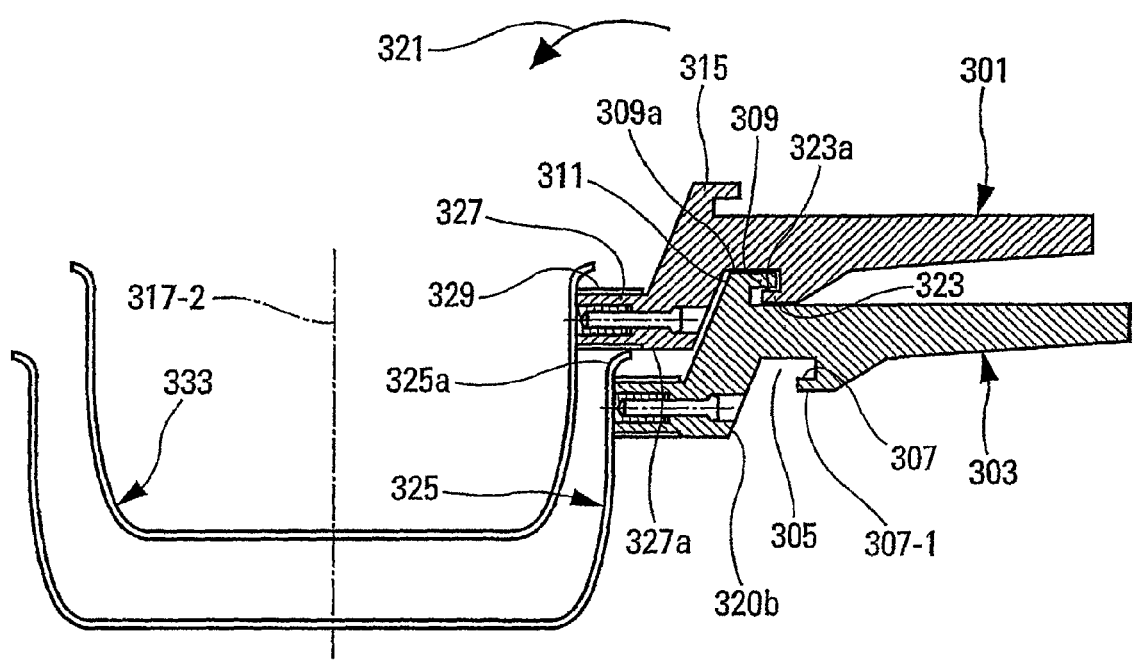
FIG. 8 shows two stacked articles, each with the handle of FIG. 6.

This possibility is illustrated in FIGS. 6 to 8, where it can be considered that there is disposed, on each handle 301 or 303, either a stud/housing assembly fulfilling the aforementioned functions, but with an engagement that is horizontal or close to the horizontal, or a protrusion-opening/reception zone assembly providing engagement, in each case, between two handles adjacent to each other.

It is the second case that is considered here, in order to facilitate the description. However, it would be possible to read "stud" in place of "protrusion" and "housing" in place of "opening (with its reception zone, void or solid)".

Under the bottom handle 303 there is provided an opening 305 having an internal rim, here rear, defining the support wall 307 and delineating a kind of hollow hook.

At the top face of this handle there is a hook 309 defining the locking protrusion that is sought and whose shape is adapted to engage relatively closely, but with a certain clearance in the hook-shaped opening 311 that is the image of the opening 305, at the bottom face of the top handle 301.

At the top face of this handle there is the hook 305 identical to the hook 309.

The containers of the articles illustrated are of different sizes. On the other hand, and as in the previous versions, the handles 301, 303 are identical to each other.

In FIG. 7 it can be seen that, laterally, the opening 311 is open so as to allow engagement, or disengagement, of the hook in question in a pivoting movement, in a horizontal plane close to the horizontal, see arrow 317.

Here an erected wall 319 defines a bottom lateral to the opening 311, delimiting the pivoting opening, in one direction.

As an alternative, it would have been possible to provide such a lateral bottom wall on one side of the hook 315.

In front of the hook 315, at the top face of the handle, and in front of the opening 311 at the bottom face, the wall of the handle is inclined aslant (frontal 320a or dorsal 320b inclined face).

In the definitive position of stacking the handles, a slight tilting of the top handle 301 is preferably provided with respect to the bottom handle 303, as shown with the arrow 321 in FIG. 8, where this tilting has not yet taken place. It occurs when the operator releases the top handle 301.

There is therefore, in principle, support at the hollow forming the hook-shaped opening or housing 311 (wall 325a). Another abutment exists. It may be at the top external face 309a of the hook 309, at the inclined frontal face 311, or even the rim 325a of the bottom container 325 (contact with the bottom face 327a of the connecting piece 327 between the top handle and the corresponding container, or with the bottom face of the base 329 adjacent to this connecting piece and which grips it).

The transverse orifice 329 engaging the means (screw 331) of fixing the handle to the container 333 emerges on the face 320b.

In FIG. 6 or 8, it will be noted that each handle is in some way provided with two hooks, one top, such as 315, the other bottom, such as 323, formed immediately adjacent to (just behind) the hook-shaped opening 311.

In this variant in FIGS. 6 to 8, by renaming "protrusion" as "stud" and "opening (with its reception zone)" as "housing", there would therefore be a stabilised stack of articles by inter-engagement of handles, a stud on one of them being for this purpose received in the complementary housing in the other, by lateral or substantially horizontal pivoting of said handles on each other.

It will be also be possible to usefully consider:
that in FIGS. 1-4, studs provided with protrusions (and therefore male/male) are combined with housings provided with orifices (178) (and therefore female/female), while in FIGS. 6-8, studs provided with orifices (therefore male/female) are conversely combined with housings provided with protrusions (therefore female/male).

Up to the time when the stud is substantially of the same volume as its orifice . . . in order to be with "a hook".

In other words the hook 315 could be considered to be a stud (315-1, FIG. 6) having a shape (here with the rim 315-2 defining the hooking zone) such that it is provided with a housing or orifice 316, while the complementary housing 311 (or 305 FIG. 8) is provided with what could be considered to be a protrusion (rim 323-1 or 307-1 defining the corresponding hooking zone).

Concerning the housing 311, it can also be considered that it is provided with a so-called "transverse orifice" at 311-1 FIG. 6, since it is thus extended, transversely (here substantially horizontally) to the upright axis 311-2 along which it stands, here substantially vertically, like the "stud" 315-1.

In the case of FIGS. 6 to 8, the tilting between the articles to be stacked therefore takes place, at least partly, in a substantially horizontal plane (317-1 and arrow 317, FIG. 7) according to which the handles of the articles to be positioned pivot with respect to each other about a vertical axis (317-2, FIG. 8), this (first) tilting being able, if so desired, to be supplemented by a second one corresponding to the arrow 321, FIG. 8.

In the case of these FIGS. 6 to 8, there may therefore be engagement of the protrusion (such as 315-2, 323-1) in its orifice (such as 311-1, 316), without support.

In this case, the reception zone 311-1, 316 will therefore be an "empty" volume without a support wall, unlike the solution in FIGS. 1-4 in particular.

What is claimed is:

1. A set of first and second handles for gripping with the bare hand first and second cooking culinary articles to be used on at least one of a cooker and a hotplate, the first cooking culinary article comprising a first container for receiving food, the second cooking culinary article comprising a second container for receiving food, the first handle being fixed to a wall of the first container, the second handle being fixed to a wall of the second container, and the first and second containers being adapted to be stacked with each other in a stationary stacked position, wherein each of the first and second handles comprises:
a stud;
a housing defined, at least partly, by a hollow zone of the handle; and
at least one of a locking protrusion for engaging a reception zone of the other handle, and a reception zone for engaging the locking protrusion of the other handle,
wherein in the stationary stacked position, the first container does not contact the second container,
wherein at least one of:
the housing of the first handle engages with the stud of the second handle for holding the first and second containers superimposed in the stationary stacked position, and
the stud of the first handle engages with the housing of the second handle for holding the first and second containers superimposed in the stationary stacked position, and
wherein each of the housings and studs extends in a direction upwards or downwards, and the at least one of the locking protrusion and the reception zone extends transversely to the directions of the housings and studs for stacking of the first and second handles.

2. The set according to claim 1,
wherein the first handle comprises the locking protrusion and the second handle comprises the reception zone, and
the locking protrusion and the reception zone are formed such that the locking protrusion of the first handle engages in the reception zone of the second handle during a stacking movement that comprises a tilting downwards of the second handle around the stud of the first handle.

3. The set according to claim 2, wherein the stacking movement further comprises, prior to the tilting, a translation that brings the locking protrusion of the first handle closer to the reception zone of the second handle before being self-locked together during the tilting, through a contact of a slanting wall of the reception zone with a bottom support wall of the locking protrusion.

4. The set according to claim 1, wherein the reception zone is a recess formed in the immediate vicinity of the housing, at an orifice that receives a screw for fixing the second handle to the second container.

5. The set according to claim 1, wherein the first handle is connected to the first container at a first end, the stud and the housing of the first handle both being located closer to the first end than an opposite end of the first handle.

6. The set according to claim 1,
wherein the first handle comprises the locking protrusion and the second handle comprises the reception zone,
the locking protrusion of the first handle comprises a bottom slanting wall zone that is externally convex downwards, and
the reception zone of the second handle comprises a slanting wall zone that is concave upwards and adapted to closely receive the bottom slanting wall zone of the locking protrusion of the first handle.

7. The set according to claim 1,
wherein the first handle comprises the reception zone and the second handle comprises the locking protrusion, and
the reception zone of the first handle is located behind an opening in the first handle, the opening being adapted to allow the locking protrusion of the second handle to pass through.

8. The set according to claim 7, wherein the locking protrusion and the reception zone are formed such that stacking causes the locking protrusion to pass through the opening and a subsequent tilting downwards of one of the handles with respect to the other causes the stud of one handle to engage in the housing of the other handle and the locking protrusion to engage with the reception zone.

9. The set according to claim 7, wherein the locking protrusion comprises a hook projecting on the surface of the second handle.

10. The set according to claim 7,
wherein the opening is located in a top or bottom wall of the first handle, and
and the locking protrusion comprises a hook projecting in an upward or downward direction.

11. The set according to claim 1, wherein in the stationary stacked position, the first and second handles are superimposed vertically and are vertically separated except where the housing of one of the handles engages the stud of the other of the handles.

12. The set according to claim 1, wherein in the stationary stacked position, the first and second handles pivot with respect to each other about a common vertical axis that passes through the housing of one of the handles and the stud of the other of the handles.

13. The set according to claim 1,
wherein the first and second cooking culinary articles belong to a set of consecutively-sized cooking culinary articles, and
the first and second cooking culinary articles are non-consecutively sized articles of the set.

14. A set of first and second handles for gripping with the bare hand first and second cooking culinary articles to be used on at least one of a cooker and a hotplate, the first cooking culinary article comprising a first container for receiving food, the second cooking culinary article comprising a second container for receiving food, the first and second containers being adapted to be stacked with each other in a stack, each of the first and second handles comprising:
a stud;
a housing defined, at least partly, by a hollow zone of the handle; and
at least one of a locking protrusion adapted to engage a reception zone of the other handle, and a reception zone adapted to engage the locking protrusion of the other handle,
wherein at least one of:
the housing of the first handle is adapted to engage with the stud of the second handle for holding the first and second containers superimposed in the stack, and
the stud of the first handle is adapted to engage with the housing of the second handle for holding the first and second containers superimposed in the stack,
each of the housings and studs extends in a direction upwards or downwards, and the at least one of the locking protrusion and the reception zone extends transversely to the directions of the housings and studs for stacking of the first and second handles, the first handle comprises the locking protrusion and the second handle comprises the reception zone, the reception zone of the second handle is formed at an orifice that is transverse to a direction in which the one of the stud and the housing rises, the housing communicating with the orifice, and the orifice receives a screw for fixing the second handle to the second container.

15. The set according to claim 14, wherein each of the first and second handles includes both the locking protrusion and the orifice, and the locking protrusions and the orifices are formed such that, during a stacking movement that comprises a tilting downwards of the second handle around the stud of the first handle, the protrusion of the first handle arrives at least substantially opposite the orifice of the second handle and remains there at the end of the tilting.

16. The set according to claim 14, wherein the locking protrusion and the reception zone are formed such that the locking protrusion of the first handle engages in the reception zone of the second handle in a vertical or substantially vertical plane, one of the stud and the housing protrudes from the handle, and the locking protrusion of the first handle is located on a vertical wall of the stud.

17. A method for stacking in a stationary stacked position a set of first and second cooking culinary articles, the first article comprising a first container for receiving food and a first handle for holding the first container, and the second article comprising a second container for receiving food and a second handle for holding the second container, each of the first and second handles including a stud, a housing defined at least partly by a hollow zone of the handle, and at least one of a locking protrusion and a reception zone, the method comprising:

tilting one of the first and second articles with respect to the other of the articles that is disposed below; and engaging at least one of the locking protrusion and reception zone of the first handle with at least one of the locking protrusion and reception zone of the second handle so as to stack the first and second containers in the stationary stacked position, wherein the locking protrusion and reception zone that are engaged extend transversely to a direction along which the studs and housings of the first and second handles extend, in the stationary stacked position, the first container does not contact the second container, and the first and second cooking culinary articles are each adapted to be put on a heating zone of at least one of a cooker and a hotplate.

18. The method according to claim 17, wherein the engaging step comprises engaging the stud of one of the handles in the housing of the other of the handles such that the first and second handles are superimposed vertically.

19. A set of first and second handles for gripping with the bare hand first and second cooking culinary articles to be used on at least one of a cooker and a hotplate, the first cooking culinary article comprising a first container for receiving food, the second cooking culinary article comprising a second container for receiving food, the first and second containers being adapted to be stacked with each other in a stationary stacked position, each of the first and second handles comprising:

at least one of a stud, and a housing defined at least partly by a hollow zone of the handle; and at least one of a locking protrusion adapted to engage a reception zone of the other handle, and a reception zone adapted to engage the locking protrusion of the other handle, wherein the at least one of the housing and the stud of the first handle is adapted to engage with the at least one of the housing and the stud of the second handle for holding the first and second containers superimposed in the stationary stacked position, the first and second handles are identical, in the stationary stacked position, the first container does not contact the second container, and each of the housings and studs extends in a direction upwards or downwards.

20. A set of first and second handles for gripping with the bare hand first and second cooking culinary articles to be used on at least one of a cooker and a hotplate, the first cooking culinary article comprising a first container for receiving food, the second cooking culinary article comprising a second container for receiving food, the first and second containers being adapted to be stacked with each other in a stationary stacked position, each of the first and second handles comprising:

at least one of a stud, and a housing defined at least partly by a hollow zone of the handle; and at least one of a locking protrusion adapted to engage a reception zone of the other handle, and a reception zone adapted to engage the locking protrusion of the other handle, wherein the at least one of the housing and the stud of the first handle is adapted to engage with the at least one of the housing and the stud of the second handle for holding the first and second containers superimposed in the stationary stacked position, in the stationary stacked position, the first container does not contact the second container, and the at least one of the locking protrusion and the reception zone of the first handle is adapted to engage with the at least one of the locking protrusion and the reception zone of the second handle, the locking protrusion being located along a vertical wall of the stud, and the reception zone being located along a vertical wall of the housing.

21. The set according to claim 20, wherein each of the housings and studs extends in a direction upwards or downwards for stacking the first and second handles.

* * * * *